United States Patent

Yamaoka et al.

Patent Number: 5,771,309
Date of Patent: Jun. 23, 1998

[54] METHOD FOR MEASURING POSITION OF HOLE

[75] Inventors: Naoji Yamaoka; Koji Oda, both of Sayama, Japan

[73] Assignee: Honda Giken Kogyo Kabushiki Kaisha, Tokyo, Japan

[21] Appl. No.: 405,450

[22] Filed: Mar. 16, 1995

Related U.S. Application Data

[63] Continuation of Ser. No. 165,825, Dec. 14, 1993, abandoned.

[30] Foreign Application Priority Data

Mar. 26, 1993 [JP] Japan ..................................... 5-067977
Mar. 26, 1993 [JP] Japan ..................................... 5-067978

[51] Int. Cl.[6] .............................. G06K 9/00; G06K 9/36
[52] U.S. Cl. ......................... 382/152; 382/147; 382/288; 348/94
[58] Field of Search .................................... 382/147, 149, 382/199, 204, 203, 288, 291, 141, 152; 348/87, 94

[56] References Cited

U.S. PATENT DOCUMENTS

| | | | |
|---|---|---|---|
| 4,424,588 | 1/1984 | Satoh et al. | 382/48 |
| 4,647,208 | 3/1987 | Bieman | 356/375 |
| 4,776,027 | 10/1988 | Hisano et al. | 382/48 |
| 4,791,482 | 12/1988 | Barry et al. | 382/1 |
| 4,803,735 | 2/1989 | Nishida et al. | 382/48 |
| 5,014,331 | 5/1991 | Kurogane et al. | 382/48 |
| 5,086,478 | 2/1992 | Kelly-Mahaffey et al. | 382/48 |

FOREIGN PATENT DOCUMENTS

| | | |
|---|---|---|
| 56-155804 | 2/1981 | Japan . |
| 59-12302 (A) | 7/1982 | Japan . |
| 61-34405 (A) | 7/1984 | Japan . |
| 61-207904(A) | 3/1985 | Japan . |
| 63-243802(A) | 3/1987 | Japan . |
| 62-186328 | 12/1987 | Japan . |
| 63-008505 | 1/1988 | Japan . |
| 3-225205 (A) | 1/1990 | Japan . |
| 4-321185 (A) | 12/1990 | Japan . |
| WO-92/05399 | 4/1992 | WIPO . |

*Primary Examiner*—Leo Boudreau
*Assistant Examiner*—Bhavesh Mehta
*Attorney, Agent, or Firm*—Armstrong, Westerman, Hattori, McLeland, & Naughton

[57] ABSTRACT

The position of a hole is measured by image-sensing a holed portion formed in a workpiece and then measuring the central position of the holed portion based on an image of the holed portion on a screen of an image sensing apparatus. A plurality of hole edge points which coincide with a hole edge of the image of the holed portion are picked up. A regression ellipse which represents the image of the holed portion from coordinates of the hole edge points is calculated. The central position of the holed portion is obtained from coordinates of the center of the regression ellipse.

5 Claims, 4 Drawing Sheets

METHOD FOR MEASURING POSITION OF HOLE

This application is a continuation of application Ser. No. 08/165.825 filed Dec. 14, 1993, now abandoned.

BACKGROUND OF THE INVENTION

1. Field of the Invention

The present invention relates to a method of measuring the position of a hole which is formed in a workpiece, by image-sensing a holed portion and then measuring the central position of the holed portion on the basis of the image data, on a screen of an image sensing means, of the holed portion.

2. Description of Related Art

As this kind of measuring method, there has conventionally been used the following method. Namely, the screen is scanned in a horizontal x-axis direction to obtain the coordinates of hole edge points in those two places in the horizontal x-axis direction which correspond to the hole edge of the image of the holed portion. This scanning operation is repeated by moving the scanning position in a vertical y-axis direction. The x-axis coordinate of the central point of the holed portion is obtained by averaging the x-axis coordinate of the middle point between each set of the two hole edge points in the x-axis direction. The screen is scanned also in the y-axis direction to obtain the coordinates of hole edge points in two places in the y-axis direction. This scanning operation is repeated by moving the scanning position in the x-axis direction. The y-axis coordinate of the central point of the holed portion is obtained by averaging the y-axis coordinates of the middle point between each set of the two hole edge points in the y-axis direction.

Projections and/or depressions due to noises or the like sometimes appear on the hole edge of the image of the holed portion, with the result that the hole edge does not form a continuous curve. In such a case, an error due to the projections and/or depressions is included in the scanned data, so that the measuring accuracy will become poor.

In order to eliminate this kind of disadvantages, the following method is known in Japanese Published Unexamined Patent Application No. 155804/1981. Namely, there is obtained an amount of deviation of each hole edge point relative to that reference circle of a predetermined diameter which is formed about the central position as calculated in the above-described manner. The change in the amount of deviation in each of the hole edge points is checked to see, based on the continuity thereof, whether the image is normal or not. The central position is obtained by deleting, out of the scanned data, the hole edge points which are discontinuous in changes.

In order to check the continuity of the changes in the amount of deviation relative to the reference circle as described above, it is necessary to scan the screen at a minute or very small pitch to detect and memorize the coordinates of a large number of hole edge points. This results in a disadvantage in that the data processing work becomes troublesome.

Further, if the workpiece is inclined relative to an optical axis of the image-sensing means, the image of the holed portion becomes elliptic. It follows that the above-described method which is based on an assumption that the image of the holed portion becomes circular is likely to give rise to measuring errors.

In view of the above-described points, the present invention has an object of providing a method of measuring the position of a hole with a high accuracy by using coordinates of a relatively small number of hole edge points.

According to the present invention, the foregoing and other objects are attained by a method of measuring a position of a hole by image-sensing a holed portion formed in a workpiece and then measuring a central position of the holed portion based on an image of the holed portion on a screen of image sensing means, the method comprising the steps of: picking up a plurality of hole edge points which coincide with a hole edge of the image of the holed portion; calculating a regression ellipse which represents the image of the holed portion from coordinates of the hole edge points; and obtaining the central position of the holed portion from coordinates of a center of the regression ellipse.

By calculating such a regression ellipse as will pass through a plurality of hole edge points which are picked up from the hole edge of the image of the holed portion, the image of the holed portion is determined as a circle if the image is a circle and as an ellipse if the image is elliptic, with the result that the central position of the holed portion can accurately be obtained.

In case projections and/or depressions due to noises or the like occur on the hole edge of the image of the holed portion, the accuracy of calculating the regression ellipse becomes poor if a hole edge point to be picked up from such an abnormal portion of the image is included in the hole edge points which are made the basis of calculating the regression ellipse. Therefore, it is preferable to obtain coordinates of the center of gravity of the image of the holed portion and to judge whether each of the hole edge points is present within a predetermined annular area which is set on the screen based on the center of gravity. The regression ellipse is calculated from coordinates of remaining hole edge points after deleting a hole edge point which is present outside the annular area.

Further, in case where the holed portion is of such a special holed portion with a collar or the like as to cause reflection of light beam inside thereof, the image of the holed portion will no longer be a normal one due to light reflected from inside thereof if the light source which illuminates the workpiece is positioned right opposite, or just in front of, the workpiece. In such a case, if the light source is disposed such that an optical axis thereof crosses the surface of the workpiece slantingly, the light beam will not be incident onto that part of the internal circumference which is on the same side as the one where the light source is disposed. There will consequently occur no reflection of light therefrom and the image of the holed portion which is on the same side as the light source will correspond to the shape of the holed portion. Therefore, when the holed portion is of a special one as described above, it is preferable to dispose the light source which illuminates the workpiece, such that an optical axis of the light source crosses slantingly relative to the surface of the workpiece and to pick up those plurality of hole edge points which are to be made the basis of calculation of the regression ellipse from a portion, out of the entire hole edge of the image of the holed portion, which is present on the same side as the one where the light source is disposed. In this case, there is a possibility that the center of gravity of the image of the holed portion may largely deviate off the central point of the normal image of the holed portion. Therefore, when the annular area is to be set on the screen as described above to eliminate the abnormal hole edge point, it is preferable to obtain coordinates of an imaginary central point of the image of the holed portion based on a point located, among the entire hole edge of the holed portion, at an endmost point on the same side as the light source and to set the annular area based on this imaginary central point.

Further, in order to improve the accuracy of calculating the regression ellipse, it is preferable to calculate an amount of deviation off the regression ellipse of each of the hole edge points which are made the bases of calculating the regression ellipse. The regression ellipse is calculated, when a maximum amount of deviation among all amounts of deviation is above a predetermined value, from coordinates of remaining hole edge points after deleting a point of maximum amount of deviation. This step of calculating the regression ellipse is repeated until the maximum amount of deviation becomes smaller than a predetermined value.

In case where there is a possibility that the workpiece deviates in three dimensions, the holed portion is image-sensed by two pieces of image-sensing means which are disposed such that an optical axis of one of them slantingly crosses the other, and the central position of the holed portion in a spatial coordinate system is calculated by the principle of triangulation from the coordinates of the center of regression ellipse on the screen of one of the image-sensing means and the coordinates of the center of regression ellipse on the screen of the other of the image-sensing means.

By the way, there occurs the following on rare occasions in the course of repeating the calculation of the regression ellipse as described above. Namely, when the amount of deviation of the hole edge point in the normal portion of the image exceeds the amount of deviation of the hole edge point in the abnormal portion of the image, the former point is deleted and, as a result, the regression ellipse will no longer correspond to or match the normal image of the holed portion. In such a case, a distance is obtained between the center of the holed portion and a common point on the hole edge of the holed portion from that central position of the holed portion in the spatial coordinate system which is calculated by the coordinates of the centers of the regression ellipses on the screens of both of the image-sensing means and that position in the spatial coordinate system of the common point which is calculated by coordinates of those points on both of the regression ellipses which correspond to the common point. If the regression ellipse matches or corresponds to the normal image of the holed portion, this distance will become equal to the radius of the holed portion. If it does not match, the distance will largely be off the radius of the holed portion. Therefore, by comparing this distance and the radius of the holed portion, the central position can be decided to be the normal central position of the holed portion when the difference between the distance and the radius is within an allowable range. It is thus possible to prevent the central position from being wrongly determined based on the coordinates of the center of the regression ellipse which does not match the normal image.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
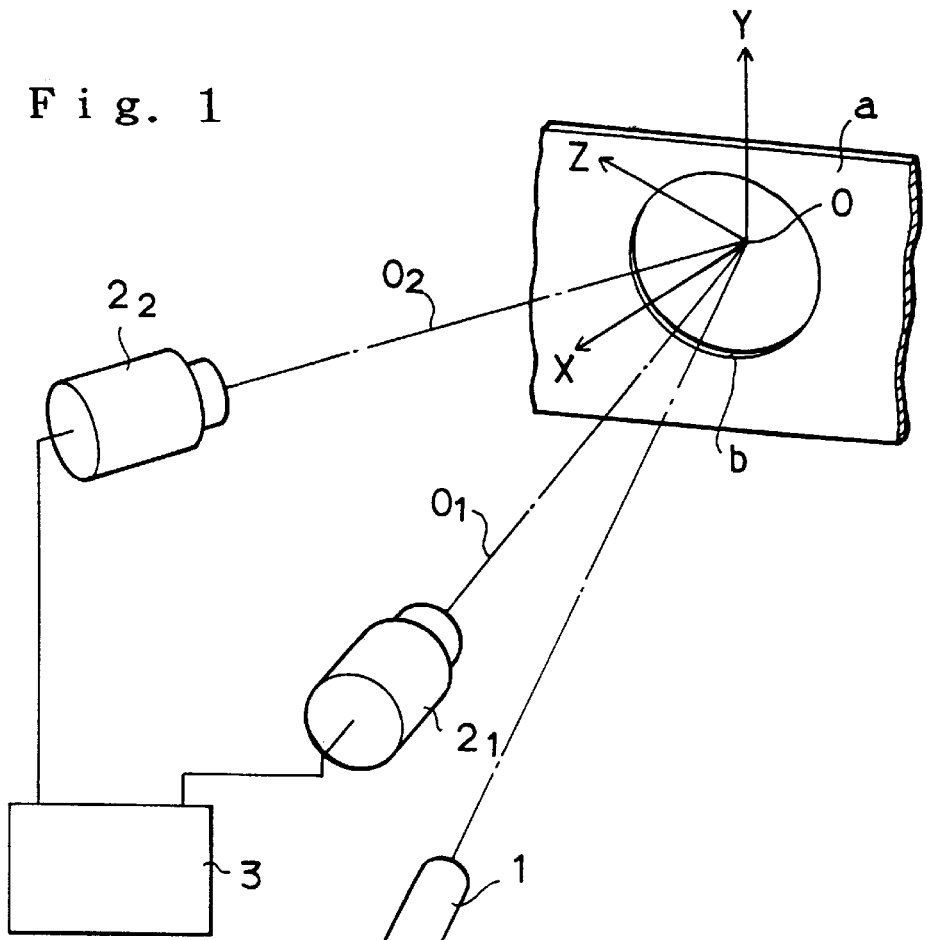
FIG. 1 is a perspective view showing an outline of a measuring apparatus to be used in carrying out the present invention method.

FIG. 1 shows a general arrangement of an apparatus for measuring the central position of that holed portion b of a predetermined diameter which is formed in a workpiece "a" such as an automobile body or the like. This apparatus comprises a spot light source 1 for illuminating the workpiece "a", a pair of first and second cameras $2_1$, $2_2$ for image-sensing the workpiece "a", and a computer 3 for inputting therein image signals from both cameras $2_1$, $2_2$. The spot light source 1 and both cameras $2_1$, $2_2$ are mounted in a predetermined positional relationship to each other on an unillustrated supporting frame which is attached to an operating end of a robot or the like. They are moved to set them in a predetermined measuring position which faces, or lies opposite to, that portion of the workpiece "a" in which the hole is formed.

Figure 2:
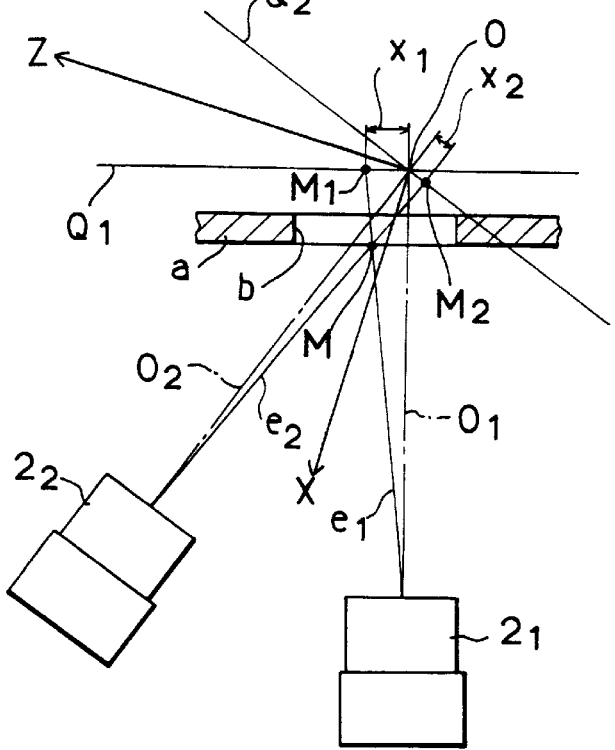
FIG. 2 is a plan view of an important portion thereof.
Figure 3:
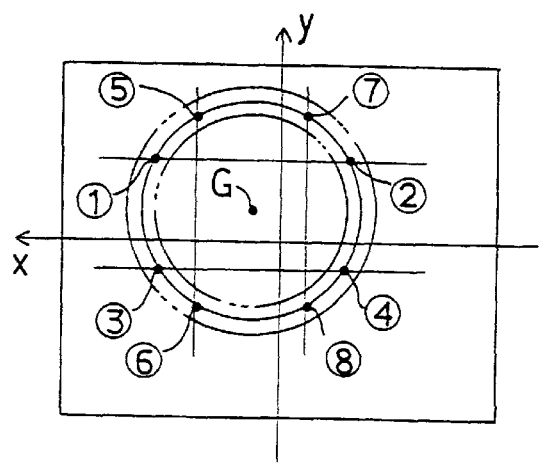
FIG. 3(a) and FIG. 3(b) are diagrams showing a screen of each camera.
Figure 3:
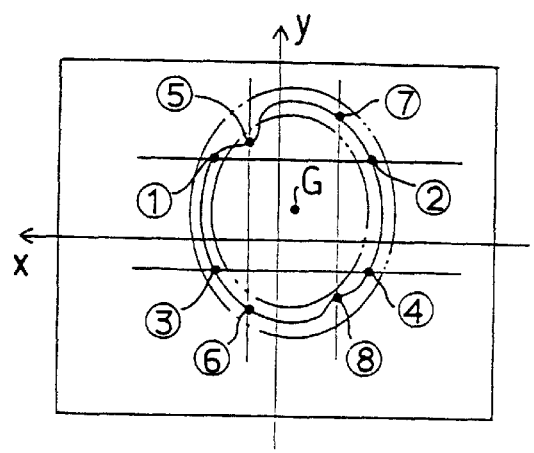

Both cameras $2_1$, $2_2$ are disposed as shown in FIG. 2 such that each of the optical axes $O_1$, $O_2$ crosses the other slantingly (i.e., at an angle) on a horizontal plane. Suppose that a spatial coordinate system is made up of an X axis and a Z axis which cross each other at a right angle on the horizontal plane, Y axis which crosses the horizontal plane at a right angle, and an origin 0 which is the crossing point of the optical axes $O_1$ and $O_2$. The central position of the holed portion b in the above-described spatial coordinate system can be calculated by using the principle of triangulation from the coordinates of the center of the image of the holed portion on each of the screens of both cameras $2_1$, and $2_2$. In more detail, as shown in FIG. 3(a) and FIG. 3(b), a horizontal x axis and a vertical y axis are set respectively on the screen of each of the cameras $2_1$, $2_2$ by defining a central point corresponding to the above-described origin O as an origin. Then, the x-axis coordinate value and the y-axis coordinate value on each screen will represent a horizontal distance and a vertical distance in the spatial coordinate system from the origin O on the projection planes (or planes of projection) $Q_1$, $Q_2$ of the cameras $2_1$, $2_2$. When the central point M of the holed portion b is considered, a projection point (or point of projection) $M_1$ of the point M as projected onto the projection plane $Q_1$ of the first camera $2_1$ becomes the central point of the image of the holed portion b on the screen of the first camera $2_1$. The horizontal distance and the vertical distance of the point $M_1$ from the origin O will be the x-axis coordinate value $x_1$ and the y-axis coordinate value $y_1$, of the point $M_1$ on the projection plane $Q_1$ of the first camera $2_2$. Similarly, the horizontal distance and the vertical distance of the point $M_2$ from the origin O will be the x-axis coordinate value $x_2$ and the y-axis coordinate value $y_2$ of the point $M_2$ on the projection plane $Q_2$ of the second camera $2_2$. An equation for the projection line (or line of projection) $e_1$ to be formed by projecting the line of sight by the first camera $2_1$ of the point M on the X–Z coordinate plane is obtained from $x_1$. An equation for the projection line $e_2$ to be formed by projecting the line of sight by the second camera $2_2$ of the point M on the X–Z coordinate plane is obtained from $x_2$. An X-axis coordinate value and a Z-axis coordinate value of the point M in the spatial coordinate system are calculated as the crossing point of both projection lines. Then, on the basis of one, e.g., the first camera $2_1$, of both cameras, the distance between a plane which is parallel to the projection plane $Q_1$ and which is inclusive of the above-described crossing point and the first camera $2_1$ is obtained. The Y-axis coordinate value of the point M is obtained by multiplying the coordinate value $y_1$ by the ratio between the above-described distance and the distance between the first camera $2_1$ and the projection plane $Q_1$.

The coordinates of the central point $M_1$, $M_2$ of the image of the holed portion b on the screen of each camera $2_1$, $2_2$ are calculated from the coordinates of a plurality of circumferential hole edge points which coincide with the hole edge of the image of the holed portion. In the present example, the center of gravity G of the image of the holed portion b is obtained first. Then, 4 pieces of hole edge points (1), (2), (3) and (4) which cross two x-axis scanning lines which are symmetrical in the y-axis direction relative to the center of gravity G and 4 pieces of hole edge points (5), (6), (7) and (8) which cross two y-axis scanning lines which are symmetrical in the x-axis direction relative to the center of gravity G, i.e., a total of 8 pieces of hole edge points, are picked up and their coordinates are detected. From the coordinates of these hole edge points the coordinates of the central point $M_1$, $M_2$ of the image on the screen of the holed portion b are calculated.

By the way, projections and/or depressions due to noises or the like sometimes appear on the hole edge of the image on the screen of the holed portion b. In consideration of a possibility that the picked up hole edge points may include a point which is located in such an abnormal portion of the image, it is so arranged that the coordinates of the central point $M_1$, $M_2$ are calculated in the following procedure.

First, a predetermined annular area is set on the screen of each of the cameras $2_1$ $2_2$ around the above-described center of gravity G such that, if the image of the holed portion b is normal, the hole edge thereof falls within the area. Here, since the first camera $2_1$ is disposed to face right opposite, or just in front of, the workpiece "a", the image on the screen of the holed portion b will be approximately circular as shown in FIG. 3(a). On the other hand, since the second camera $2_2$ is disposed such that the workpiece "a" is image-sensed slantingly, the image on the screen of the holed portion b will be elliptic as shown in FIG. 3(b). Further, taking into consideration the enlargement and contraction due to displacement of the workpiece "a" in the direction towards and away from the camera, there is set on the screen of the first camera $2_1$ a circular annular area as shown by imaginary lines in FIG. 3(a). On the other hand, there is set on the screen of the second camera $2_2$ an elliptic annular area as shown by imaginary lines in FIG. 3(b). Among the hole edge points on the screen of each of the cameras $2_1$, $2_2$, those which fall outside the annular area are deleted out of a judgement that they are points which are positioned in abnormal portions of the image. In the example of FIGS. 3(a) and 3(b), point (5) on the screen of the second camera $2_2$ is deleted.

If the center of the holed portion b is off the optical axis $O_1$ of the first camera $2_1$, the image of the holed portion b on the screen of the first camera $2_1$ will, strictly speaking, also become an ellipse which has a shorter axis in the direction of deviation of the center of the holed portion b relative to the optical axis $O_1$. The ratio of flatness (i.e., the ratio between shorter-axis radius and longer-axis radius) thereof is proportional to the amount of deviation. Therefore, it is preferable to change the shape of the annular area depending on the direction and amount of deviation of the center of gravity G relative to that origin of the coordinates on the screen which corresponds to the optical axis $O_1$.

Then, from the coordinates of the remaining hole edge points, a regression ellipse which represents the image of the holed portion is calculated. The regression ellipse is an ellipse that is obtained by regression processing such that the total of deviation amounts relative to each of the hole edge points becomes minimum. If the shape of the image of the holed portion b is a circle, then that circle is, and if it is an ellipse, then that ellipse is, calculated as the regression ellipse.

Figure 4:
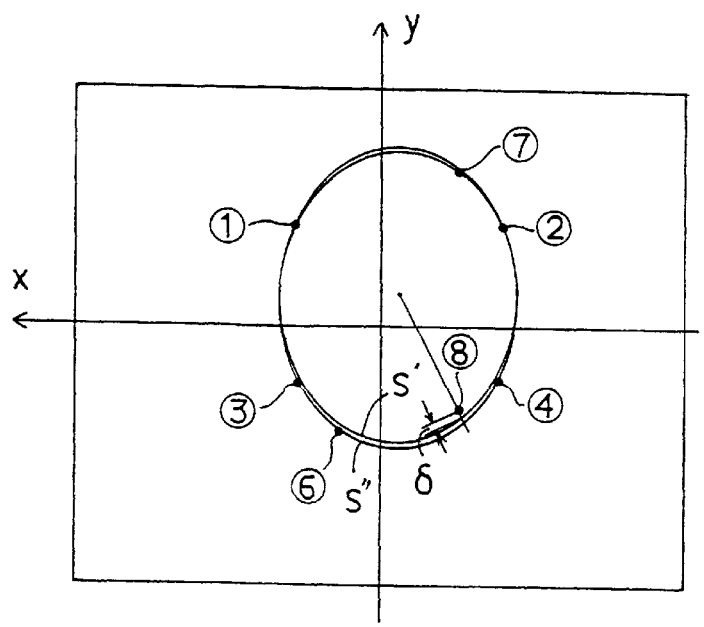
FIG. 4 is a diagram showing the relationship between a regression ellipse and each of the hole edge points.

If slight in degree, even an abnormal image will sometimes fall within the above-described annular area. A hole edge point which is picked up from a portion of this kind of abnormal image will have a large amount of deviation off, or away from, the regression ellipse. This will now be explained with reference to an example of the screen of the second camera $2_2$. The hole edge point (8) on this screen is picked up from a portion of a slightly abnormal image which happens to fall within the annular area. The amount of deviation 6 of the hole edge point (8) off the regression ellipse as shown by S' in FIG. 4 thus becomes large. As a solution, the amount of deviation of each hole edge point off the regression ellipse is calculated as a distance between a crossing point of the regression ellipse across a line connecting the center of the regression ellipse and the hole edge point, and the hole edge point. When the maximum amount of deviation among these deviations of the hole edge points is above a predetermined value, the hole edge point of the maximum deviation, i.e., the hole edge point (8) is deleted. A regression ellipse is obtained again from the coordinates of the remaining hole edge points. In the illustrated example, each of the hole edge points corresponds to the regression ellipse S" that is obtained again. This regression ellipse S' will become a target ellipse which exactly corresponds to the normal image of the holed portion b. When the maximum amount of deviation of the hole edge points off the regression ellipse obtained for the second time is above a predetermined value, a regression ellipse is obtained again by deleting the hole edge point of the maximum amount of deviation. This operation is repeated until the maximum amount of deviation becomes smaller than the predetermined value, thereby obtaining the target ellipse. When the number of hole edge points becomes small, the regression ellipse will no longer be able to be accurately obtained. Therefore, when the number of the hole edge points becomes 5 or less, an indication will be made as not measurable.

Figure 5:
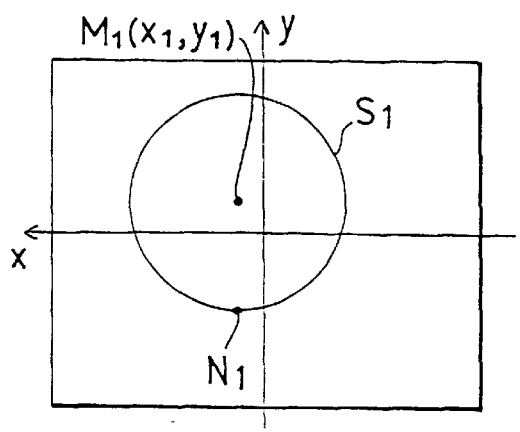
FIG. 5(a) and FIG. 5(b) are diagrams showing target ellipses to be obtained on the screen of each camera and FIG. 5(c) is a diagram showing that center of a holed portion in a spatial coordinate system which is to be calculated from the target ellipse and a point on the hole edge.
Figure 5:
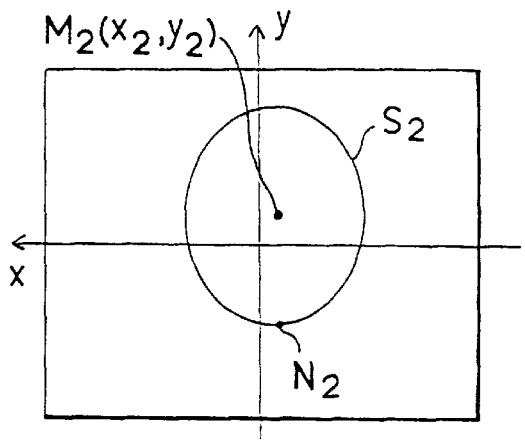
Figure 5:
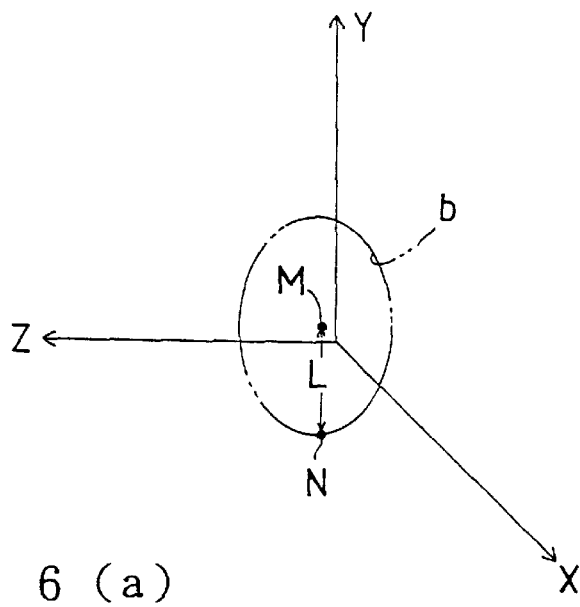

In FIG. 5(a) reference mark $S_1$ denotes a target ellipse which corresponds to a normal image of the holed portion b on the screen of the first camera $2_1$. In FIG. 5(b) reference mark $S_2$ denotes a target ellipse which corresponds to a normal image of the holed portion on the screen of the second camera $2_2$. The position in the spatial coordinate system of the central point M of the holed portion b is calculated, as described above, on the basis of the coordinates $(x_1, y_1)$ of the central point $M_1$ of the target ellipse $S_1$ on the screen of the first camera $2_1$ and the coordinates $(x_2, Y_2)$ of the central point $M_2$ of the target ellipse $S_2$ on the screen of the second camera $2_2$.

Though rarely, there are cases where a hole edge point positioned in a normal portion of the image is deleted in the process of repeatedly obtaining the regression ellipse, with the result that the target ellipse will no longer correspond to the normal image. By the way, if the position in the spatial coordinate system of a point N on the hole edge of the holed portion b shown in FIG. 5(c) is calculated by using the principle of triangulation on the basis of those coordinates of the corresponding point $N_1$ on the target ellipse $S_1$ which are obtained on the screen of the first camera $2_1$ and those coordinates of the corresponding point $N_2$ on the target ellipse $S_2$ which are obtained on the screen of the second camera $2_2$ to thereby obtain the distance L from the above-described central point M to the point N in the spatial coordinate system, this distance will be equal to the radius of the holed portion b as long as both target ellipses $S_1$, $S_2$ match or correspond to the normal image.

An arrangement is therefore made in the following manner. Namely, this distance and the radius of the holed portion b are compared and, when the difference therebetween is within an allowable range, the position of the central point M calculated as described above is determined to be the normal central position of the holed portion b. When the difference is outside the allowable range, an indication is made as not measurable.

In order to obtain the spatial coordinates of a point on the hole edge of the holed portion b, it is necessary to pick up points which correspond to common points on the hole edge of the holed portion b both on the target ellipse $S_1$ on the side of the first camera $2_1$ and on the target ellipse $S_2$ on the side of the second camera $2_2$. When the target ellipse and the axis of x-axis coordinate cross each other, the crossing points on the screen of each of the cameras $2_1$, $2_2$ of the axis of x-axis coordinate and the target ellipse $S_1$, $S_2$ will be the points corresponding to the crossing points of the hole edge of the holed portion b and the X–Z coordinate planes because the optical axes $O_1$, $O_2$ of both cameras $2_1$, $2_2$ are located on the X–Z coordinate plane. Upper and lower end points in the y-axis direction of the target ellipse $S_1$, $S_2$ will be points which correspond to the upper and lower end points, in the Y-axis direction, of the hole edge of the holed portion b. The positions of the points on the hole edge of the holed portion b in the spatial coordinate system can, therefore, be calculated from the coordinates of one of these points on both target ellipses $S_1$, $S_2$. In the example shown in FIG. 5(a) through 5(c), the position in the spatial coordinate system of the lower end point N in the Y-axis direction of the holed portion b is calculated from the coordinates of the lower end points $N_1$, $N_2$ in the y-axis direction of both target ellipses $S_1$, $S_2$.

The Y-axis coordinate values in the spatial coordinate system of points M and N can be calculated from the y-axis coordinate of the points $M_1$ or $N_1$ on the basis of the first camera $2_1$. It can also be calculated from the y-axis coordinate values of the points $M_2$ and $N_2$ on the basis of the second camera $2_2$. It is preferable to judge whether the result of calculation is acceptable or not by comparing the distance between the point M and the point N whose Y-axis coordinate values are calculated on the basis of the first camera $2_1$ and the distance between the point M and the point N whose Y-axis coordinate values are calculated on the basis of the second camera $2_2$, respectively, with the radius of the holed portion b.

Figure 6:
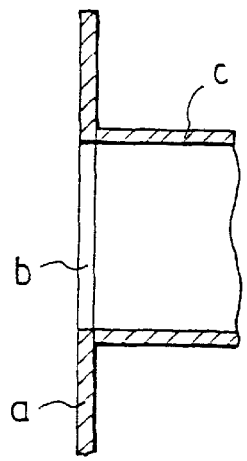
FIG. 6(a) is a sectional view showing one example of a special holed portion and FIG. 6(b) is a diagram showing an image thereof.
Figure 6:
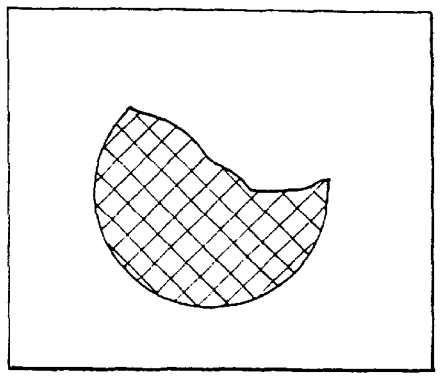
Figure 7:
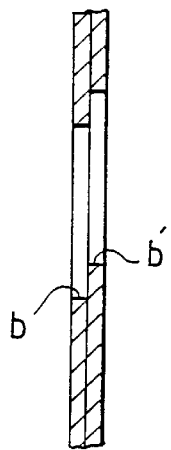
FIG. 7(a) is a sectional view showing another example of a special holed portion and FIG. 7(b) is a diagram showing an image thereof.
Figure 7:
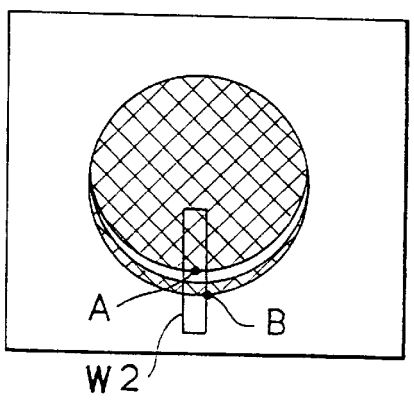

In case where the holed portion b of the workpiece "a" is provided with a collar c as shown in FIG. 6(a), or in case where the workpiece "a" is of a double-plate construction, as shown in FIG. 7(a), having a deviation in the center of holed portion b in the front plate (left side in Figure) and the center of holed portion b' in the rear plate (right side in Figure), the following may occur. Namely, when the light source to illuminate the workpiece is right opposite, or just in front of, the workpiece, the image of the holed portion will become obscure or dim over the entire circumference, in the case of FIG. 6(a), due to light irregularly reflected on the internal surface of the collar c. In the case of FIG. 7(a) the image of the holed portion will be that of the overlapped portion of both offset holed portions b, b', with the result that the image does not represent that holed portion b on the front side which is to be image-sensed.

As a solution, in the present embodying example, the following arrangement has been employed. Namely, the light source 1 is disposed below the first camera $2_1$ which is right opposite the workpiece "a", such that the optical axis of the light source 1 crosses the surface of the workpiece "a" slantingly, thereby illuminating the workpiece "a" upwards from a lower position. According to this arrangement, in the case of the holed portion in FIG. 6(a), the upper half of the holed portion b will become an image distorted by the light reflected from the collar c as shown in FIG. 6(b). The lower half of the holed portion b will, however, become a normal image. In the case of the holed portion shown in FIG. 7(a), the image of the lower half of the holed portion b will appear as a shadow below the image of the lower half of the holed portion b' as shown in FIG. 7(b). In either of the above cases, the image of the lower half of the holed portion, i.e., the image of the holed portion that lies on the same side as the one in which the light source 1 is disposed will become the shape corresponding to that of the holed portion b which is the object of measuring. If, among the hole edge points, a plurality of hole edge points which coincide with the portion lying on the same side as the light source 1 are picked up, and a regression ellipse is obtained from the coordinates of these hole edge points, the normal image of the holed portion can be identified.

Figure 8:
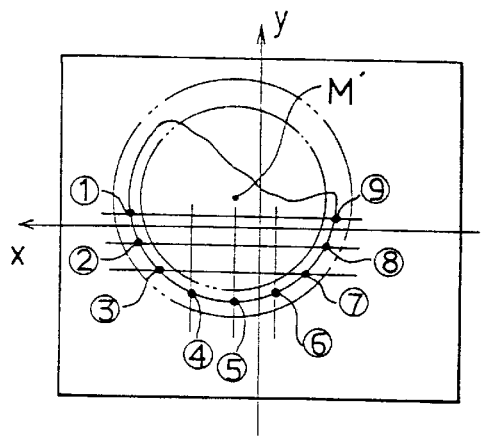
FIG. 8 is a diagram showing image processing for an image of a special holed portion.

The procedure of processing the image of a special holed portion is explained hereinbelow with reference to an example of the image of the first camera $2_1$, the holed portion of which is the one shown in FIG. 6(a). First, a point that is located at an endmost point on the side where the light source 1 is disposed, i.e., the lowermost point is detected. Then, the lower half of the image of the holed portion is scanned, as shown in FIG. 8, by means of a plurality of those scanning lines in the x-axis direction and y-axis direction which are in a predetermined positional relationship with the lower end point. A plurality of those hole edge points (1) through (9) which cross the scanning lines are then picked up.

Figure 9:
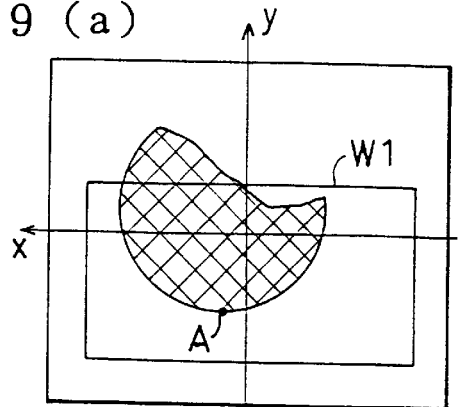
FIG. 9(a), FIG. 9(b) and FIG. 9(c) are diagrams showing the procedure of detecting a lower end point of an image of a special holed portion.
Figure 9:
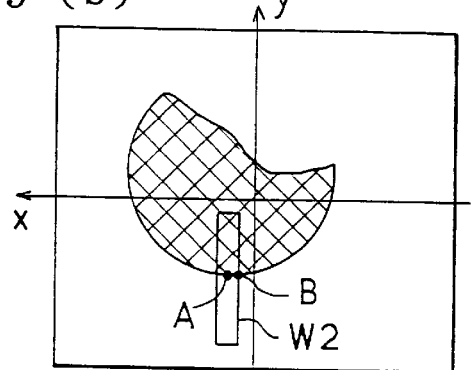
Figure 9:
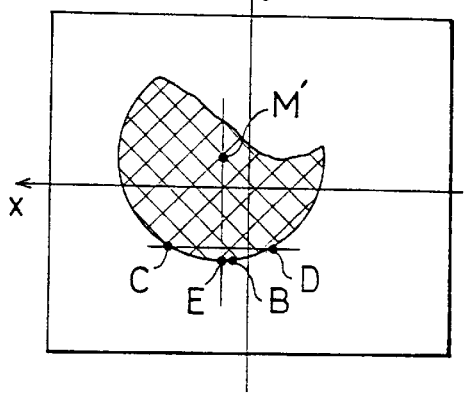

In detecting the above-described lower end point, a stationary window W1 is set on the screen as shown in FIG. 9(a). A lower end point of the border line between a bright portion and a dark portion within the window W1 is detected as point A. Then, as shown in FIG. 9(b), a floating window W2 is set based on this point A. An upper end point of a maximum block in the bright portion within the window W2 is detected as point B. In case the holed portions b, b' which are out of alignment with each other as shown in FIG. 7(a) are image-sensed, there is a possibility that the point A to be detected within the stationary window WI will be the lower end point of the image of the holed portion b' as shown in FIG. 7(b). However, if the point B is detected by setting the floating window W2, the lower end point of the image of the holed portion b is detected as the point B, thereby preventing a wrong detection. Here, the y-axis coordinate value of the point B coincides with the y-axis coordinate value of the lower end point of the image of the holed portion with a predetermined accuracy. There is however no guarantee that the x-axis coordinate value of the point B coincides with the x-axis coordinate value of the lower end point of the image of the holed portion. Therefore, the following arrangement has been employed. Namely, by scanning in the x-axis direction at a position slightly above the point B, two hole edge points C, D in the x-axis direction are detected as shown in FIG. 9(c). Then, a point that has the same x-axis coordinate value as a middle point between the two points C, D and that has the same y-axis coordinate value as the point B is determined to be a lower end point E of the image of the holed portion.

After picking up the hole edge points (1) through (9) as described above, there is carried out a procedure of setting an annular area on the screen and deleting a hole edge point or points which lie outside the annular area. In doing so, the annular area was set in the above-described example based on the center of gravity of the image of the holed portion. However, in case the holed portion is of a special construction as described above, there is a possibility that the center of gravity of the image of the holed portion is largely off the central point of the normal image of the holed portion. As a result, there will no longer be able to set an annular area such that only the abnormal portion of the image is driven out thereof. Therefore, in such a case, a point which is away upwards by a distance corresponding to the radius of the holed portion is set as an imaginary central point M' based on the lower end point E. An annular area is then set as shown in FIG. 8 based on the imaginary central point M' in place of the center of gravity.

Thereafter, a regression ellipse may be obtained in the same procedure as the one described above. According to this arrangement, there can be obtained a regression ellipse which corresponds to a circle if the lower half of the image of the holed portion is part of a circle and to an ellipse if it is part of an ellipse. Therefore, the central point of the holed portion b of a special construction as shown in FIG. 6(a) or FIG. 7(a) can also be accurately measured.

As can be seen from the above-described description, according to the present invention, it is possible to accurately measure the central position of a holed portion by obtaining a regression ellipse corresponding to a normal image of the holed portion from the coordinates of a relatively small number of hole edge points on the hole edge of the image of the holed portion. As compared with a conventional method in which coordinates of a large number of hole edge points must be detected and memorized, the present invention has advantages in that the data processing becomes easy and that the measuring accuracy is improved.

It is readily apparent that the above-described method of measuring a position of a hole meets all of the objects mentioned above and has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of measuring a position of a hole by image-sensing a holed portion formed in a workpiece and then measuring a central position of the holed portion based on an image of the holed portion on a screen of image sensing means, said method comprising the steps of:

picking up a plurality of hole edge points which coincide with a hole edge of the image of the holed portion;

obtaining an ellipse in a regression processing by using coordinates of the plurality of hole edge points such that the total of deviation amounts relative to each of the hole edge points become minimum, said ellipse thereby representing the image of the holed portion;

obtaining the central position of the holed portion from coordinates of the center of the ellipse;

wherein the steps of obtaining said ellipse in a regression processing comprises:

obtaining coordinates of a center of gravity of the image of the holed protion;

judging whether each of the hole edge points is present within a predetermined annular area which is set on the screen based on the center of gravity, wherein said ellipse is obtained from coordinates of remaining hole edge points after deleting a hole edge point which is present outside the annular area;

calculating an amount of deviation off the ellipse of each of the hole edge points which are made the basis of obtaining the ellipse;

said ellipse being obtained when a maximum amount of deviation among all amounts of deviation is above a predetermined value, from coordinates of remaining hole edge points after deleting a point of maximum amount of deviation, said step of obtaining the ellipse being repeated until the maximum amount of deviation becomes smaller than a predetermined value.

2. A method of measuring a position of a hole according to claim 1, further comprising the step of:

disposing a light source which illuminates the workpiece such that an optical axis of the light source crosses slantingly relative to a surface of the workpiece;

said plurality of hole edge points being picked up from a portion, out of the entire hole edge of the image of the holed portion, which is present on the same side as the one in which the light source is disposed.

3. A method of measuring a position of a hole according to claim 2, further comprising the steps of:

obtaining coordinates of an imaginary central point of the image of the holed portion based on a point located, among the entire hole edge of the holed portion, in an endmost point on the same side as the one in which the light source is disposed; and judging whether each of the hole edge points is located within a predetermined annular area which is set on the screen based on the imaginary central point;

wherein said ellipse is obtained from coordinates of remaining hole edge points after deleting a hole edge point which is present outside the annular area.

4. A method of measuring a position of a hole according to claim 1, wherein said image-sensing of the holed portion is made by two pieces of image-sensing means which are disposed such that an optical axis of one of them slantingly crosses the other, and wherein the central position of the holed portion in a spatial coordinate system is obtained from coordinates of the center of the ellipse on the screen of one of the image-sensing means and coordinates of the center of the ellipse on the screen of the other of the image-sensing means.

5. A method of measuring a position of a hole according to claim 4, further comprising the steps of:

obtaining a distance between the center of the holed portion and a common point on the hole edge of the holed portion from that central position of the holed portion in the spatial coordinate system which is calculated by the coordinates of the centers of the ellipses on the screens of both of the image-sensing means and that position in the spatial coordinate system of the common point which is calculated by coordinates of those points on both of the ellipses which correspond to the common point;

comparing the distance and the radius of the holed portion; and deciding the central position as the normal central position of the holed portion when a difference between the distance and the radius is within an allowable range.

* * * * *